June 10, 1952  W. F. BRANCH  2,599,809
SUN VISOR FOR MOTOR VEHICLES
Filed Feb. 25, 1949  2 SHEETS—SHEET 1
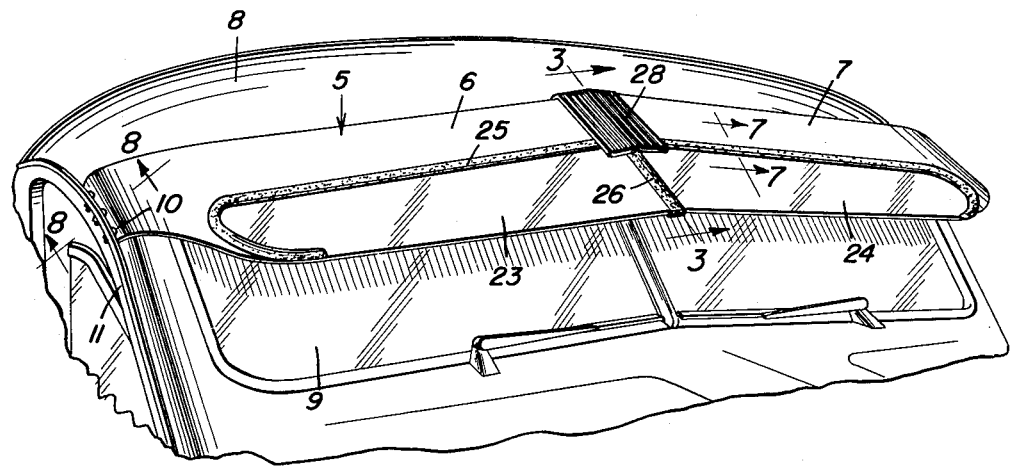
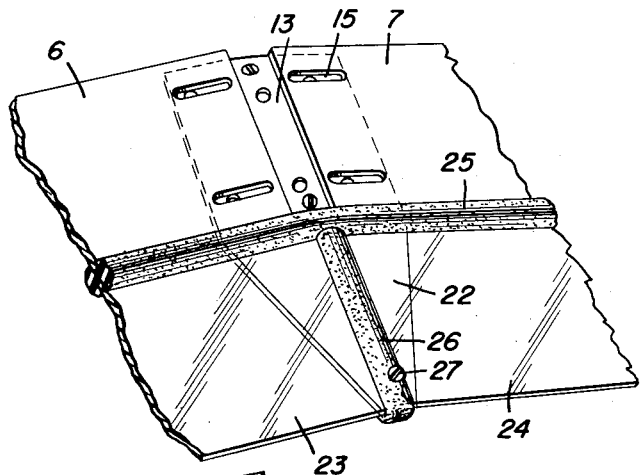
Inventor
William F. Branch
By *Clarence A. O'Brien and Harvey B. Jacobson*
Attorne June 10, 1952     W. F. BRANCH     2,599,809
SUN VISOR FOR MOTOR VEHICLES
Filed Feb. 25, 1949     2 SHEETS—SHEET 2
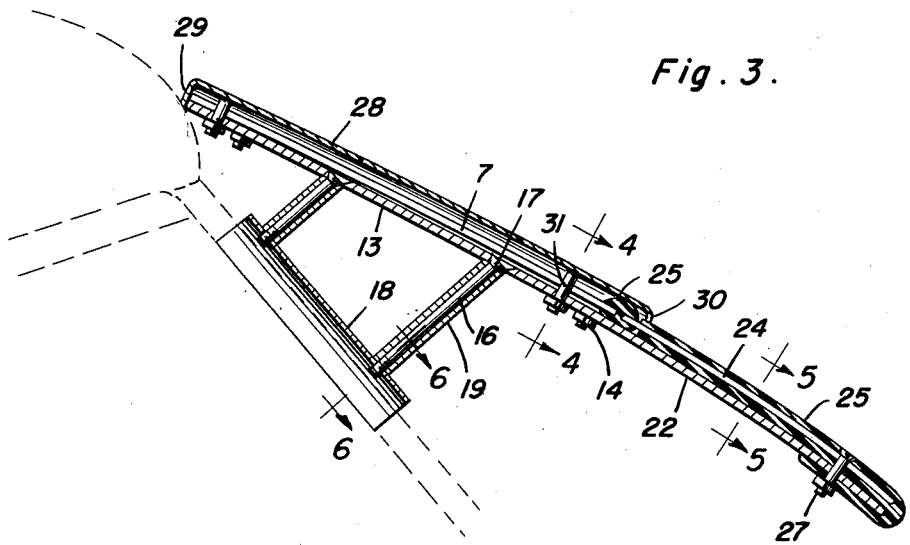
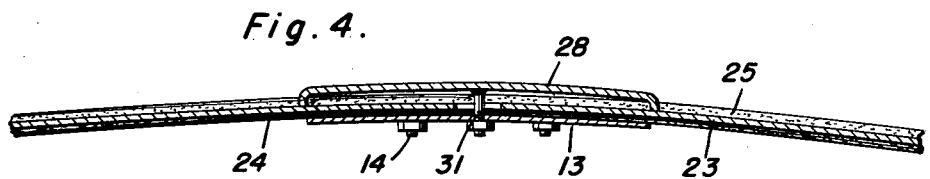
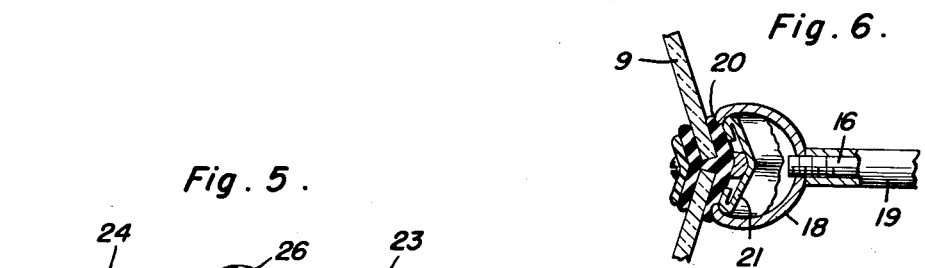
Inventor
William F. Branch
By *Clarence A. O'Brien and Harvey B. Jackson*
Attorneys Patented June 10, 1952

2,599,809

UNITED STATES PATENT OFFICE 2,599,809

SUN VISOR FOR MOTOR VEHICLES

William F. Branch, Buffalo, N. Y.

Application February 25, 1949, Serial No. 78,308

1 Claim. (Cl. 296—95)

The present invention relates to new and useful improvements in sun visors for automobiles and other motor vehicles, and more particularly to an external sun visor overlying the windshield.

An important object of the invention is to provide a sun visor of this character including an opaque rear portion for attaching to the top of an automobile above the windshield, and a transparent or translucent front portion to eliminate the glare of the sun without obstructing the vision of the driver.

Another object of the invention is to provide a novel construction for securing the anti-glare front portion of the visor to the rigid rear portion thereof, as well as a novel construction for attaching and supporting the visor on the center frame of the windshield, as well as to the body of the vehicle.

A still further object is to provide a device of this character of simple and practical construction, which is neat and attractive in appearance, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is an enlarged fragmentary perspective view of the center of the visor with the center cover plate removed;

Figure 3 is an enlarged sectional view taken substantially on a line 3—3 of Figure 1;

Figure 4 is a fragmentary sectional view taken on a line 4—4 of Figure 3;

Figure 5 is a fragmentary sectional view taken on a line 5—5 of Figure 3;

Figure 6 is a fragmentary transverse sectional view of the channel shaped clamping bracket for supporting the center of the visor on the center windshield frame;

Figure 7 is a fragmentary sectional view of the channel moulding connecting the front and rear portions of the visor to each other, and;

Figure 8 is a fragmentary sectional view taken on a line 8—8 of Figure 1 and showing the attaching means for the side edges of the visor.

Referring now to the drawings in detail wherein for the purpose of illustration I have disclosed a preferred embodiment of the invention. The numeral 5 designates the sun visor generally and which comprises a pair of rear sections 6 and 7, preferably constructed of sheet metal and positioned transversely of the top 8 of an automobile immediately above the windshield 9 and secured thereto by means of substantially J-shaped bolts 10, positioned at the outer edges of the sections 6 and 7, and secured to the rain trough 11 of the vehicle by nuts 12 threaded on the lower ends of the bolt.

The inner ends of the sections 6 and 7, are secured to each other by a lower connecting plate 13 provided with bolts and nuts 14 received in slots 15 at the inner ends of sections 6 and 7 to compensate for variations in the width of the body of the vehicle.

Bolts 16 have their heads 17 countersunk in the plate 13 to extend downwardly therefrom with the lower ends of the bolts threaded in a channeled shaped clamping bracket 18. Spacing sleeves 19 are positioned on bolts 16 between the plate 13 and the bracket 18.

The edges of the channel clamping bracket 18 are formed with inwardly projecting lips 20 engaged under the center frame 21 of the windshield 9 to thus anchor the center of the visor to the windshield and to support the visor in an elevated position above the windshield.

The center attaching plate 13 is formed with a forwardly projecting tongue 22 having tapering side edges and which underlies the inner ends of a pair of front anti-glare visor sections 23 and 24 of suitable translucent material. The rear and side edges of the anti-glare sections 23 and 24 are secured to the front edges of rear visor sections 6 and 7 by channeled rubber moulding 25 and the outer end or side edges of the sections 6 and 7 are curved inwardly in front of the anti-glare sections 23 and 24 to hold the latter from forward separating movement in the moulding.

The inner ends of the anti-glare sections 23 and 24 are held from separating movement by a channeled moulding strip 26 secured to tongue 22 by a bolt and nut 27, the front end of strip 26 being hooked under the tongue and also secured thereto by the bolt and nut 27.

A top center cover plate 28 is positioned over the inner ends of rear sections 6 and 7 with a downturned lip 29 at its rear edge engaged behind sections 6 and 7 and lower plate 12 and a downturned lip 30 at its front edge engaging the moulding strip 26.

Bolts and nuts 31 secure the top and bottom plates 28 and 13 in clamping position over the meeting ends of sections 6 and 7.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is shown and described a preferred embodiment of the invention the same is susceptible to certain changes fully comprehended by the spirit of the invention as herein described and the scope of the appended claim.

Having described the invention, what is claimed as new is:

A sun visor for a motor vehicle of the type having a center windshield frame, said visor comprising an opaque visor structure including a pair of sections having facing inner ends, means attaching the outer ends of said sections to the vehicle with said sections projecting forwardly above the windshield, upper and lower clamping plates connecting the inner ends of said sections together, a channeled clamping member engaging said frame to support the center of the structure, bolts with spacing sleeves thereon connecting said lower clamping plate to the channeled clamping member, a forwardly projecting tongue on the lower clamping plate, a translucent visor structure supported in a forwardly projecting position at the front edge of said opaque structure and including a pair of sections with inner ends facing, and means attaching the inner ends of the sections of the translucent structure to said tongue.

WILLIAM F. BRANCH.

REFERENCES CITED

The following references are of record in the file of this patent:

UNITED STATES PATENTS

| Number | Name | Date |
| --- | --- | --- |
| D. 154,861 | Maher | Aug. 16, 1949 |
| D. 155,030 | Oswald | Aug. 30, 1949 |
| D. 159,062 | Hallstead | June 20, 1950 |
| 1,982,511 | Geist | Nov. 27, 1934 |
| 2,189,138 | Eichner | Feb. 6, 1940 |
| 2,334,856 | Atkinson | Nov. 23, 1943 |